C. YOUNGS.
AUTOMOBILE TRUCK.
APPLICATION FILED MAY 28, 1914.
1,167,243.
Patented Jan. 4, 1916.
2 SHEETS—SHEET 2.
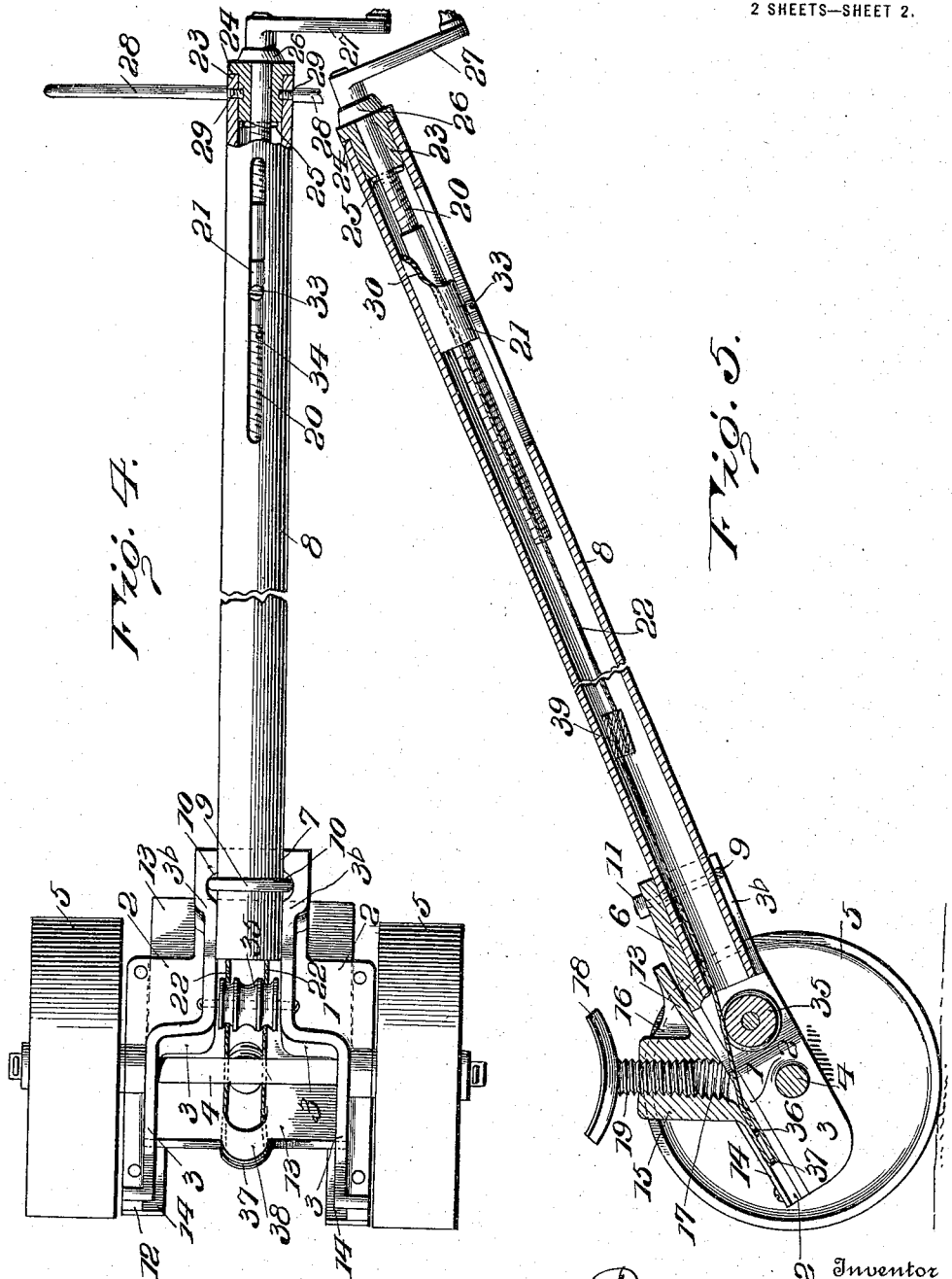

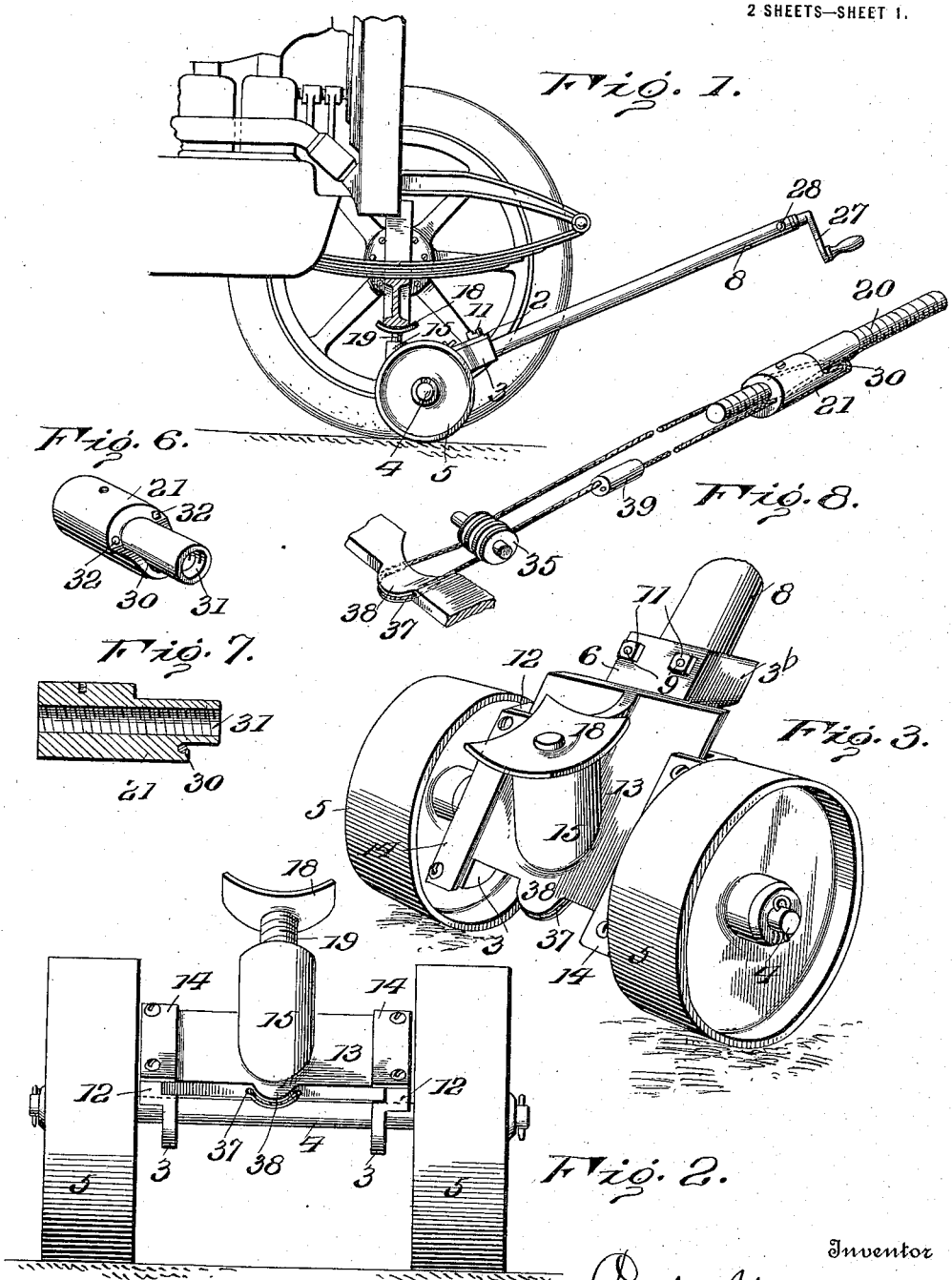

UNITED STATES PATENT OFFICE.

CHARLES YOUNGS, OF WELLSVILLE, NEW YORK.

AUTOMOBILE-TRUCK.

1,167,243. Specification of Letters Patent. Patented Jan. 4, 1916.

Application filed May 28, 1914. Serial No. 841,504.

*To all whom it may concern:*

Be it known that I, CHARLES YOUNGS, a citizen of the United States, and a resident of Wellsville, in the county of Allegany and State of New York, have invented certain new and useful Improvements in Automobile-Trucks, of which the following is a specification.

My invention relates to that class of trucks which are designed primarily for use in garages and the like where it often becomes necessary in the handling of automobiles and other vehicles to turn the same about in a limited space or to pull them around sharp corners. Trucks of this nature are usually provided with a special form of jack, whereby, after they have been thrust below the axle of a vehicle, the end of said vehicle may be elevated until its wheels are clear of the floor. In this position the entire weight of that end of the vehicle rests upon the wheels of the truck and one is thus enabled to move the same about at will.

My invention consists of a truck of the construction hereinafter described and claimed.

In the accompanying drawings: Figure 1 is a side elevation of my truck illustrating its application. Fig. 2 is a rear elevation. Fig. 3 is a perspective view. Fig. 4 is a bottom plan view, partly in section. Fig. 5 is a longitudinal section. Figs. 6, 7 and 8 are details.

In the drawings, 1 represents the body portion of my truck which, in its preferred form, comprises an inclined base plate 2 having reinforcing flanges 3 formed integral therewith. The rear portion of these flanges 3 are sufficiently separated from each other to afford suitable bearings for the axle 4 upon which are mounted the supporting wheels 5; while their forward portions 3ᵇ (Fig. 4) are brought comparatively close together, thus serving in conjunction with an extension 6 of the base plate 2 to form a receiving pocket 7 for an end of the tongue 8. That part of the base plate 2 included between the rear portion of the flanges 3 may be cut away, as shown, for reasons which will hereinafter appear. It will be noted that the extension 6 is not in the same plane with the base plate 2, but is bent therefrom in a direction approximating the horizontal.

The pocket 7 is made just large enough to receive the end of the tongue 8 and is provided at its opposite sides with grooves 10 for receiving the U-bolt 9 which passes about the tongue and thence up through the extension 6. This U-bolt is provided with nuts 11 by means of which the same may be drawn up tight against the bottom of the tongue thus holding the tongue securely in position against the under face of the extension 6 of the base plate.

The base plate 2 is further provided on its opposite edges with a pair of longitudinally extending, upwardly projecting portions 12 which serve as guides for the slidable plate 13 mounted therebetween. Upon the top face of each of these projecting portions is securely fastened a plate 14 overhanging the inner edge thereof. These are for the purpose of maintaining the plate 13 in position against the base plate. At a point a little to the rear of the center of this plate 13 is mounted a standard 15 which is preferably made integral therewith, the connecting web 16 acting as a reinforcement for the same. This standard is provided with a vertical, screw-threaded recess 17 which, as illustrated, may extend completely through plate 13.

The vehicle engaging member comprises a cunrved plate 18 with a supporting shank 19 secured thereto. The plate 18 is provided with a concave upper surface, as shown, in order that it may partially embrace the under side of the axle of a vehicle, while the shank 19 is screw-threaded to engage the threads in the recess 17 of standard 15. It is preferable that these threads be of such a pitch as will allow the shank 19 to be turned through a considerable angle without materially affecting the elevation of the plate 18. Thus it will be seen that I have provided not only a slidable support for the vehicle engaging member but a pivotal support as well.

The tongue 8 is preferably formed of a hollow cylindrical tube in order that the adjusting means may be contained therein. This adjusting means comprises a rotatable screw 20, a sleeve 21 mounted thereon, and a medium 22 for connecting the sleeve with the slidable plate 13. The screw is mounted within the tubular tongue by means of a sleeve 23 in which it is journaled. This sleeve 23 is of a diameter equal to the interior diameter of the tongue 8 and is provided with an annular shoulder 24 which abuts against the end of the tongue. Sleeve 23 is held in place on the screw by means of a pin 25 passing therethrough and a shoulder 26 on the crank handle 27, which handle is made fast to the screw and constitutes the means for turning it.

The cross handles 28 have reduced portions 29 adapted to be screwed through suitable holes in the tongue 8 and thence into recesses in the sleeve 23 provided therefor. In this manner the sleeve is securely held in position in the end of the tongue.

Sleeve 21 is of sufficient diameter to allow a sliding fit within the tongue 8, one of its ends, however, being reduced to form a shoulder 30 (Figs 6, 7 and 8) for engagement with the cable 22. This sleeve is provided with three holes extending longitudinally therethrough, the larger central hole 31 being threaded to engage the threads on the screw 20 while the other holes 32 (Fig. 6) are merely to permit the passage of the cable 22. A small screw 33 is set into the side of the sleeve and is adapted to slide in a longitudinal slot 34 in the under side of the tongue, thus preventing the turning of the sleeve within the tongue but allowing it to be moved longitudinally thereof.

Member 22 is preferably a stiff wire cable but it is obvious that I may use a chain or any other suitable means for connecting sleeve 21 with the slidable plate 13. This cable is threaded through the holes 32 in the sleeve, the loop, thus formed, engaging the shoulder 30. From thence the cable is drawn through the tubular tongue 8, over the pulley 35 mounted on and between the aforesaid flanges 3, through suitable apertures leading to the rear edge of the slidable plate 13, and thence along a groove 37 formed on the edge of a curved projection 38, its free ends being secured together by any appropriate means such as indicated at 39.

In the application of my device, the truck is tilted downward by raising the tongue 8 and is thrust under the axle of the vehicle, the plate 18 engaging the under part of the axle midway of its end. Then the tongue 8 is forced downward, thus compelling the vehicle engaging member 18 to be raised and thereby raising the front end of the vehicle clear of the ground so that the truck may be used as the means of turning the automobile in lieu of the front wheels. In the event that the vehicle engaging member is too high or too low, its elevation may be changed by turning the same, or the crank handle 27 may be worked to move the vehicle engaging member up or down in its inclined guideway. In fact this last operation may be accomplished either before or after the truck is in position under the axle of the automobile.

The foregoing is merely a description of a single embodiment of my invention in its preferred form and it is obvious therefore that changes and modifications may be made therein without departing from the spirit of my invention, the scope of which is defined by the claims appended hereto.

What I claim as my invention is:

1. An automobile truck comprising a body portion mounted on wheels and having an inclined support, a member slidably mounted on said inclined support, a vehicle engaging member adjustably supported by said slidable member whereby said vehicle engaging member may be raised or lowered with respect to the slidable member, and means for adjusting the position of said slidable member on said inclined support whereby said engaging member is elevated.

2. An automobile truck comprising a body portion mounted on wheels and having a support inclined in its normal working position, a vehicle engaging member slidably mounted on said inclined support, a tongue secured to said body portion, and means positioned near the free end of said tongue and operable independently of the tongue for causing the engaging member to slide on the inclined support.

3. An automobile truck comprising a body portion mounted on wheels and provided with an inclined guideway, a member slidably mounted in said guideway and provided with a threaded recess, a vehicle engaging member provided with a shank threaded to engage the threads in said recess, means for adjusting the position of said slidable member in said guideways, and means for tilting said body portion.

4. An automobile truck comprising a body portion mounted on wheels and provided with an inclined guideway; a vehicle engaging member slidably mounted in said guideway; a hollow tongue secured to said body portion; a screw rotatably fixed within said tongue; a non-rotatable sleeve mounted on and engaging said screw; means connecting said sleeve with said vehicle engaging member; and means for turning said screw.

5. An automobile truck comprising a carriage mounted on wheels and provided with an inclined guideway; a member slidably mounted in said guideway; a vehicle engaging member pivotally mounted on said slidable member; and a tongue for tilting said carriage provided with means for moving the slidable member in said guideway.

6. An automobile truck comprising a body portion mounted on wheels; a tongue secured to said body portion; an inclined guideway on said body portion; a member slidably mounted in said guideway; a vehicle engaging member pivotally mounted on said slidable member; and means within said tongue for adjusting the position of the slidable member.

7. An automobile truck comprising a body portion mounted on wheels and provided with an inclined guideway; a member slidably mounted in said guideway; a vehicle engaging member pivotally mounted on said slidable member; a tongue secured to said body portion; a member movable longitudinally of said tongue; means for moving said member; and means connecting said movable member with the slidable engaging member.

8. An automobile truck comprising a body portion mounted on wheels and provided with an inclined guideway; a member slidably mounted in said guideway; a vehicle engaging member pivotally mounted on said slidable member; a hollow tongue secured to said body portion; a screw rotatably fixed within said tongue; a non-rotatable sleeve mounted on and engaging said screw; means connecting said sleeve with said slidable member; and means for turning said screw.

In testimony whereof I affix my signature in presence of two witnesses.

CHARLES YOUNGS.

Witnesses:
 JESSE L. GRANTIER,
 J. B. MURRAY.

Copies of this patent may be obtained for five cents each, by addressing the "Commissioner of Patents, Washington, D. C."